US012729291B2

(12) United States Patent
House et al.

(10) Patent No.: US 12,729,291 B2
(45) Date of Patent: Sep. 8, 2026

(54) COMPOUNDS FOR TREADS AND TYRES COMPRISING THEM

(71) Applicant: Pirelli Tyre S.p.A., Milan (IT)

(72) Inventors: John Nazareno House, Milan (IT); Francesca Baione, Milan (IT)

(73) Assignee: PIRELLI TYRE S.p.A., Milan (IT)

( * ) Notice: Subject to any disclaimer, the term of this patent is extended or adjusted under 35 U.S.C. 154(b) by 606 days.

(21) Appl. No.: 18/256,895

(22) PCT Filed: Dec. 14, 2021

(86) PCT No.: PCT/IB2021/061704

§ 371 (c)(1),
(2) Date: Jun. 9, 2023

(87) PCT Pub. No.: WO2022/130201

PCT Pub. Date: Jun. 23, 2022

(65) Prior Publication Data

US 2024/0101796 A1 Mar. 28, 2024

(30) Foreign Application Priority Data

Dec. 16, 2020 (IT) ........................ 102020000031115

(51) Int. Cl.
*C08L 9/00* (2006.01)
*B60C 1/00* (2006.01)
(Continued)

(52) U.S. Cl.
CPC .............. *C08L 9/00* (2013.01); *B60C 1/0016* (2013.01); *C08F 2/26* (2013.01); *C08F 212/08* (2013.01);
(Continued)

(58) Field of Classification Search
CPC ................. C08L 9/00; C08L 2205/025; C08L 2205/035; C08L 2205/02; C08L 2205/03;
(Continued)

(56) References Cited

U.S. PATENT DOCUMENTS 4,398,582 A * 8/1983 Yuto ..................... B60C 1/0016 524/496
4,843,120 A * 6/1989 Halasa ...................... C08L 9/00 525/914
(Continued)

FOREIGN PATENT DOCUMENTS

DE 10 2015 210 424 A1 12/2016
EP 3 450 205 A1 3/2019
(Continued)

OTHER PUBLICATIONS

International Search Report form the European Patent Office in corresponding International Application No. PCT/IB2021/061704 mailed Apr. 11, 2022.
(Continued)

*Primary Examiner* — Doris L Lee
(74) *Attorney, Agent, or Firm* — Finnegan, Henderson, Farabow, Garrett & Dunner, L.L.P.

(57) ABSTRACT

The present invention relates to elastomeric compositions and compounds for tyres, in particular for tyre treads, comprising elastomeric polymers in specific ratios and having particular Tg values, tyre components and tyres for vehicle wheels which comprise them. These compounds find particular application in all-season tyres as they give them good maneuverability on snow, grip in the wet and advantageously limited wear of the tread.

15 Claims, 4 Drawing Sheets

(51) Int. Cl.
*C08F 2/26* (2006.01)
*C08F 212/08* (2006.01)

(52) U.S. Cl.
CPC ... *C08L 2205/025* (2013.01); *C08L 2205/035* (2013.01)

(58) Field of Classification Search
CPC . C08L 9/06; C08L 7/00; B60C 1/0016; C08F 2/26; C08F 212/08
See application file for complete search history.

(56) References Cited

U.S. PATENT DOCUMENTS

| | | | | |
|---|---|---|---|---|
| 2004/0122157 | A1* | 6/2004 | Labauze | C08L 21/00 524/487 |
| 2009/0105403 | A1 | 4/2009 | Hirabayashi | |
| 2018/0100058 | A1 | 4/2018 | Pavon Sierra et al. | |
| 2019/0061425 | A1 | 2/2019 | Broemmel et al. | |
| 2019/0062529 | A1 | 2/2019 | Isitman et al. | |
| 2019/0062535 | A1 | 2/2019 | Broemmel et al. | |
| 2020/0048439 | A1 | 2/2020 | Ganesan et al. | |
| 2020/0071506 | A1 | 3/2020 | Steiner et al. | |

FOREIGN PATENT DOCUMENTS

| | | | |
|---|---|---|---|
| EP | 3 450 206 | A1 | 3/2019 |
| WO | WO 2018/050748 | A1 | 3/2018 |
| WO | WO 2019/154791 | A1 | 8/2019 |
| WO | WO 2019/154828 | A1 | 8/2019 |

OTHER PUBLICATIONS

Written Opinion of the International Searching Authority from the European Patent Office in corresponding International Application No. PCT/IB2021/061704 mailed Apr. 11, 2022.

* cited by examiner

A
B
C
D
E 0,6
0,5
0,4
0,3
0,2
0,1
0

-70 -60 -50 -40 -30 -20 -10 0 10 20 30

T (°C)

COMPOUNDS FOR TREADS AND TYRES COMPRISING THEM

This application is a national stage entry application under 35 U.S.C. § 371 of International Application No. PCT/IB2021/061704, filed on Dec. 14, 2021, and claims priority to Italian Application No. 102020000031115, filed Dec. 16, 2020; the contents of each application is incorporated herein by reference in its entirety.

The present invention relates to compositions for elastomeric compounds for tyres, in particular for all-season tyre treads, comprising elastomeric polymers, immiscible in those specific ratios and having particular Tg values, tyre components and tyres for vehicle wheels comprising said compounds.

These compositions allow manufacturing long-distance tyres suitable for all seasons, which therefore do not need to be replaced in seasonal changes.

PRIOR ART

Within the scope of all-season tyres, car manufacturers require increasingly higher performance both on dry and wet, with increased grip at low temperatures without unbalancing the overall properties. Ideally, tyres that perform equally well on any type of road surface, in all weather conditions and temperatures and, at the same time, characterised by reduced wear are desired. This result is very difficult to achieve.

It is known in the art that the wear and snow grip performance of tyres may be is improved if the glass transition temperature (Tg) of the tread compound is lowered, as discussed for example in WO2018050748.

Compounds with low glass transition temperatures may be obtained for example by adding, under miscibility conditions, elastomeric polymers having low Tg, such as polybutadiene rubber (BR) (Tg around −110° C.), natural rubber (NR) (Tg around −65° C.) or styrene butadiene rubber (SBR), with a low styrene content (for example not more than 20%, with Tg around −70° C./−50° C.) or with a higher styrene content (higher than 20%, with Tg around −40° C./−20° C.).

However, the lowering of the Tg of the compound involves a significant variation of the hysteretic properties of the same. Typically, as the Tg of the compound falls, the peak and the entire Tan delta curve move towards lower temperatures, with a drop in hysteresis in the temperature range of between 0° C. and 10° C., a range indicative of the grip performance of the tread in the wet.

Therefore, the benefit in terms of less wear and better grip on snow obtained by lowering the Tg of the tread compound by adding low Tg elastomeric polymers is inevitably associated with worsening performance in the wet.

Another approach to reduce the Tg of the tread compound may be the addition of plasticisers, for example low Tg oils and/or resins, in high amounts, however, to the detriment of wear and tear resistance.

The patent application US2019062529 (Goodyear) describes a compound comprising natural rubber (NR) and an SBR polymer synthesized by solution (S-SBR) having a Tg of from −85° C. to −50° C. According to the description, this compound has improved grip in the wet and performance at low temperatures (i.e. on snow) while the wear resistance is not considered. A compound according to this document, comprising a natural rubber and a SBR having a Tg of −62° C., was reproduced in the present experimental part (Comparative Example A).

The patent application US2019062535 (Goodyear) in par. 8 describes in general terms a compound comprising natural rubber (NR), a first SBR polymer having a Tg of from −70° C. to −5° C. or from −40° C. to −10° C. and a second SBR polymer having a Tg of from −30° C. to −5° C., which is said to have improved wet grip and wear is resistance. The only example of the invention (Table 1) relates to a compound comprising, in addition to a natural rubber, two SBR polymers having substantially the same Tg (SBR1 −23° C. and SBR3 −22.4° C.). The document does not consider or test the possible performances on snow.

A compound according to the teaching of this document, comprising a natural rubber and an SBR having a Tg of −28° C., very close to that exemplified, was reproduced in the present experimental part (Comparative Example B).

The patent application US2020071506 (Steiner Pascal Patrick et al.) describes a vulcanisable rubber composition comprising a first styrene-butadiene rubber polymerised in solution having a glass transition temperature (Tg) of between −80° C. and −50° C. and a second styrene-butadiene rubber polymerised in solution having a glass transition temperature (Tg) comprised between −40° C. and −10° C. The described composition comprises plasticisers, i.e. oil plus resin, in high amounts, higher than 55 phr.

The patent applications US2020048439 (Ganesan Swarupini et al.), EP3450206 (Goodyear), WO2019154791 (Apollo Tyres Global R&D B.V.), US2009105403 (HIRABAYASHI KAZUYA), EP3450205 (Goodyear), WO2019154828 (Apollo Tyres Global R&D B.V.) e DE102015210424 (Continental Reifen Deutschland Gmbh) describe in very general terms compositions for tyre compounds comprising one or more SBR polymers.

At present, therefore, the need remains to provide an elastomeric compound for tyre treads characterised by good driveability on snow, reduced wear and high grip in the wet, for applications in all-season tyres.

SUMMARY OF THE INVENTION

The Applicant has undertaken studies aimed at giving the elastomeric compounds for tyres the desired properties discussed above and has surprisingly found that by appropriately selecting the nature and the amount of the elastomeric polymers, it is possible to obtain improved performance in terms of both grip on snow and increased wear resistance and, unexpectedly, wet grip.

The elastomeric compounds of the invention are in fact characterised by a particular hysteresis pattern: in fact, in addition to having a first hysteresis peak at low temperatures, which is advantageous for winter performance and for limiting wear, they show a second increase at higher temperatures, with improved effects in terms of road grip in the wet.

This hysteresis pattern is the result of the careful selection of the elastomeric polymers and their amounts in the compound—so as to provide non-homogeneous compounds characterised by a double peak of Tg and, consequently, of hysteresis, with the correct positioning of the peaks at the temperatures of interest.

The teachings offered by the prior art, in particular by the documents commented above, do not lead to this result. The Applicant has in fact experimented (Comparative Examples A and B) that by preparing compounds with the components and in the amounts suggested therein, the desired properties associated with the present particular pattern of the hysteresis curve are not obtained.

The Applicant, with an intense research activity, was instead able to select a particular composition of elastomers consisting of at least one isoprene rubber and two different styrene-butadiene rubbers, characterised by specific Tg values and used in precise amounts, which in the final compounds results in an ideal pattern of the hysteretic properties, predictive of the aforementioned advantageous performances of the tyre on the road.

Conveniently, the elastomeric compounds according to the invention may, for example, be used in the production of tyre treads for all seasons, capable of offering good road grip in all weather conditions and, at the same time, a long distance.

Therefore, a first aspect of the present invention is an elastomeric composition for tyre compounds comprising at least:

100 phr of a composition of elastomeric polymers (A) consisting of (A1) 35 to 65 phr of at least one isoprene polymer (IR) having a Tg of between −70° C. and −60° C., (A2) 15 to 45 phr of at least one styrene-butadiene polymer (SBR) having a Tg of between −70° C. and −55° C., (A3) 5 to 40 phr of at least one styrene-butadiene polymer (SBR) having a Tg of between −35° C. and −25° C., 5 to 25 phr of at least one resin (B), 5 to 45 phr of at least one plasticising oil (C), at least 10 phr of at least one reinforcing filler (D), and at least 0.5 phr of the at least one vulcanising agent (E), wherein the total amount of plasticiser, including both the resin (B) and the oil (C), is from 25 to 55 phr.

A further aspect of the present invention is a vulcanised elastomeric compound for tyres obtained by mixing and vulcanising the elastomeric composition according to the invention.

A further aspect of the present invention is a tyre component comprising the compound according to the invention.

A further aspect of the present invention is a tyre for vehicle wheels comprising at least one tyre component according to the invention.

Definitions

The term "elastomeric composition for tyre compounds" means a composition comprising at least one diene elastomeric polymer and one or more additives, which by mixing and possible heating provides an elastomeric compound suitable for use in tyres and their components.

The components of the elastomeric composition are not generally introduced simultaneously into the mixer but typically added in sequence. In particular, the vulcanisation additives, such as the vulcanising agent and possibly the accelerant and retardant agents, are usually added in a downstream step with respect to the incorporation and processing of all the other components.

In the final vulcanisable elastomeric compound, the individual components of the elastomeric composition may be altered or no longer individually traceable as modified, completely or in part, due to the interaction with the other components, of heat and/or mechanical processing. The term "elastomeric composition" herein is meant to include the set of all the components that are used in the preparation of the elastomeric compound, regardless of whether they are actually present simultaneously, are introduced sequentially or are then traceable in the elastomeric compound or in the final tyre.

The term "elastomeric polymer" indicates a natural or synthetic polymer which, after vulcanisation, may be stretched repeatedly at room temperature to at least twice its original length and after removal of the tensile load substantially immediately returns with force to approximately its original length (according to the definitions of the ASTM D1566-11 Standard terminology relating to Rubber).

The term "diene polymer" indicates a polymer or copolymer derived from the polymerisation of one or more different monomers, among which at least one of them is a conjugated diene (conjugated diolefin).

The term "elastomeric compound" indicates the compound obtainable by mixing and possibly heating at least one elastomeric polymer with at least one of the additives commonly used in the preparation of tyre compounds.

The term "vulcanisable elastomeric compound" indicates the elastomeric compound ready for vulcanisation, obtainable by incorporation into an elastomeric compound of all the additives, including those of vulcanisation.

The term "vulcanised elastomeric compound" means the material obtainable by vulcanisation of a vulcanisable elastomeric compound.

The term "composition of immiscible elastomeric polymers" means a composition of diene elastomeric polymers which, in the specified ratios, by mixing provide a heterogeneous mixture characterised by at least two glass transitions, i.e. by at least two Tg peaks.

The term "green" indicates a material, a compound, a composition, a component or a tyre not yet vulcanised.

The term "vulcanisation" refers to the cross-linking reaction in a natural or synthetic rubber induced by a sulphur-based cross-linking agent.

The term "vulcanising agent" indicates a product capable of transforming natural or synthetic rubber into elastic and resistant material due to the formation of a three-dimensional network of inter- and intra-molecular bonds. Typical vulcanising agents are sulphur-based compounds such as elemental sulphur, polymeric sulphur, sulphur-donor agents such as bis[(trialkoxysilyl)propyl]polysulphides, thiurams, dithiodimorpholines and caprolactam-disulphide.

The term "vulcanisation accelerant" means a compound capable of decreasing the duration of the vulcanisation process and/or the operating temperature, such as TBBS, sulphenamides in general, thiazoles, dithiophosphates, dithiocarbamates, guanidines, as well as sulphur donors such as thiurams.

The term "vulcanisation activating agent" indicates a product capable of further facilitating the vulcanisation, making it happen in shorter times and possibly at lower temperatures. An example of activating agent is the stearic acid-zinc oxide system. The term "vulcanisation retardant" indicates a product capable of delaying the onset of the vulcanisation reaction and/or suppressing undesired secondary reactions, for example N-(cyclohexylthio)phthalimide (CTP).

The term "vulcanisation package" is meant to indicate the vulcanising agent and one or more vulcanisation additives selected from among vulcanisation activating agents, accelerants and retardants.

The term "reinforcing filler" is meant to refer to a reinforcing material typically used in the sector to improve the mechanical properties of tyre rubbers, preferably selected from among carbon black, conventional silica, such as silica from sand precipitated with strong acids, preferably amorphous, diatomaceous earth, calcium carbonate, titanium dioxide, talc, alumina, aluminosilicates, kaolin, silicate fibres and mixtures thereof.

The term “white filler” is meant to refer to a conventional reinforcing material used in the sector selected from among conventional silica and silicates, such as sepiolite, paligorskite also known as attapulgite, montmorillonite, alloisite and the like, possibly modified by acid treatment and/or derivatised. Typically, white fillers have surface hydroxyl groups.

The term “mixing step (1)” indicates the step of the preparation process of the elastomeric compound in which one or more additives may be incorporated by mixing and possibly heating, except for the vulcanising agent which is fed in step (2). The mixing step (1) is also referred to as “non-productive step”. In the preparation of a compound there may be several “non-productive” mixing steps which may be indicated with 1a, 1b, etc.

The term “mixing step (2)” indicates the next step of the preparation process of the elastomeric compound in which the vulcanising agent and, possibly, the other additives of the vulcanisation package are introduced into the elastomeric compound obtained from step (1), and mixed in the material, at controlled temperature, generally at a compound temperature lower than 120° C., so as to provide the vulcanisable elastomeric compound. The mixing step (2) is also referred to as “productive step”.

For the purposes of the present description and the following claims, the term “phr” (acronym for parts per hundreds of rubber) indicates the parts by weight of a given elastomeric compound component per 100 parts by weight of the elastomeric polymer, considered net of any extension oils.

Unless otherwise indicated, all the percentages are expressed as percentages by weight.

DETAILED DESCRIPTION OF THE INVENTION

Figure 1:
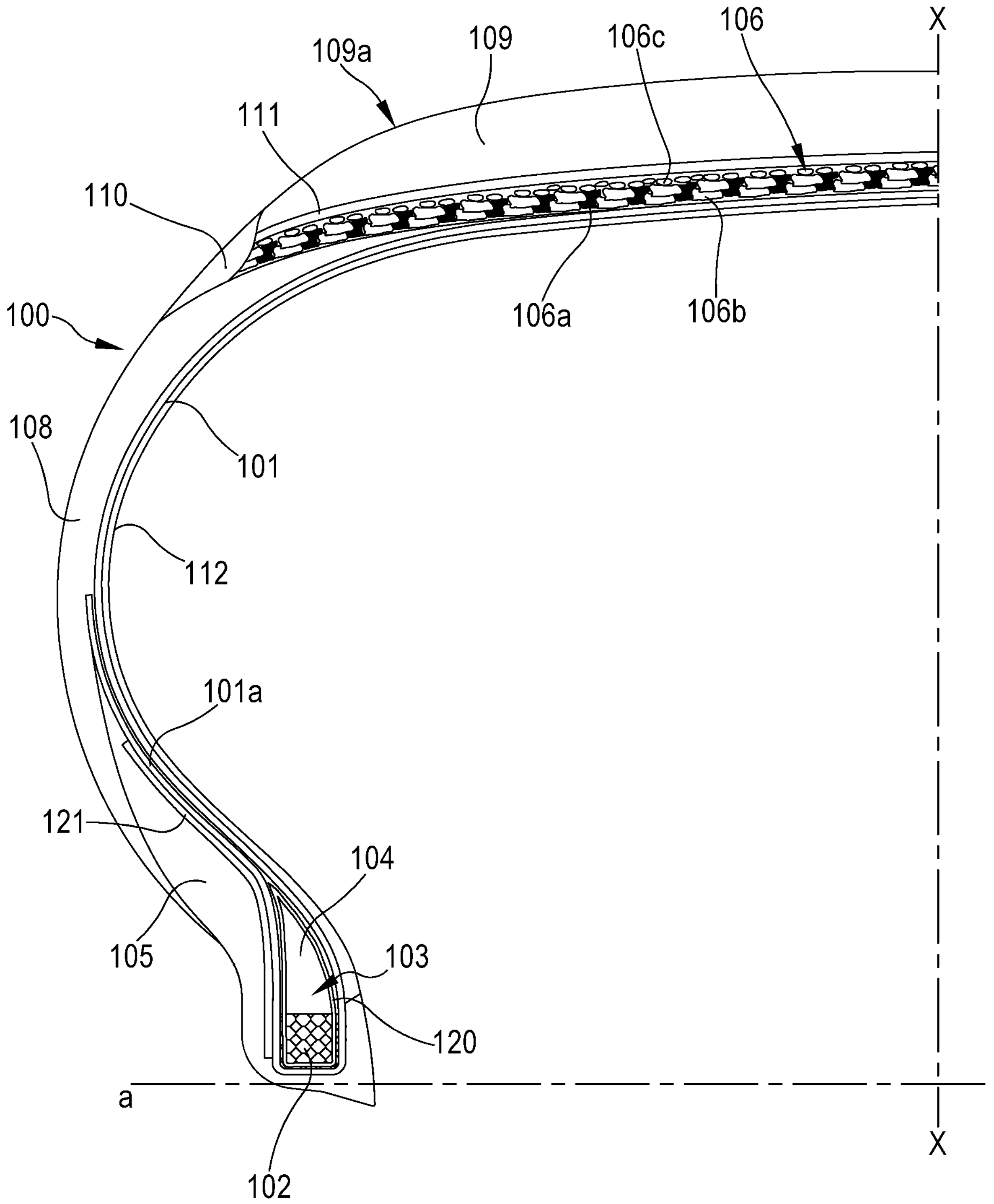
FIG. 1 schematically shows a semi-sectional view of a tyre for vehicle wheels according to the present invention.

The elastomeric composition for tyre compounds according to the present invention is characterised by one or more of the following preferred aspects taken alone or in combination with one another.

Preferably the elastomeric composition according to the invention comprises 100 phr of a composition of elastomeric polymers (A) consisting of (A1) 40 to 60 phr of at least one isoprene polymer (IR) having a Tg of between −65° C. and −60° C., (A2) 20 to 40 phr of at least one styrene-butadiene polymer (SBR) having a Tg of between −70° C. and −55° C., (A3) 10 to 35 phr of at least one styrene-butadiene polymer (SBR) having a Tg of between −35° C. and −25° C., and preferably, 7 to 20 phr of at least one resin (B), 10 to 35 phr of at least one plasticising oil (C), at least 10 phr of at least one reinforcing filler (D), and at least 0.5 phr of the at least one vulcanising agent (E).

In a preferred embodiment, the elastomeric composition according to the invention comprises 100 phr of a composition of elastomeric polymers (A) consisting of (A1) 45 to 55 phr of at least one isoprene polymer (IR) having a Tg of between −65° C. and −60° C., (A2) 25 to 35 phr of at least one styrene-butadiene polymer (SBR) having a Tg of between −65° C. and −60° C., (A3) 15 to 25 phr of at least one styrene-butadiene polymer (SBR) having a Tg of between −30° C. and −25° C., and preferably, 10 to 20 phr of at least one resin (B), 20 to 30 phr of at least one plasticising oil (C), at least 20 phr of at least one reinforcing filler (D), and at least 1 phr of the at least one vulcanising agent (E).

The composition of elastomeric polymers (A) comprises at least one isoprene polymer (IR) having a Tg comprised between −70° C. and −60° C. (A1), preferably between −65° C. and −60° C.

Preferably the present composition comprises said isoprene rubber (A1) in an amount higher than 40 phr and lower than 60 phr, more preferably higher than 45 phr and lower than 55 phr.

In the present context, isoprene polymer or isoprene rubber (IR) means a synthetic or natural elastomer obtained by adding 1,4-cis of isoprene. Preferably, the isoprene polymer (A1) is a natural rubber (NR). Isoprene polymers and natural rubbers are well known to those skilled in the field of tyres.

Commercial example of a suitable isoprene polymer (A1) is SIR20 by Aneka Bumi Pratama.

The composition of elastomeric polymers (A) comprises, in addition to isoprene rubber (A1), two different styrene-butadiene polymers (A2) and (A3) characterised by a Tg of between −70° C. and −55° C. and of between −35° C. and −25° C., respectively.

In the present context, styrene-butadiene (SBR) polymer is meant as a copolymer comprising monomer units of styrene and butadiene, with a percentage of styrene preferably of between 10 and 30% by weight and of vinyl of between 25 and 65% by weight (with respect to butadiene).

In particular, the styrene-butadiene polymer (SBR) having a Tg comprised between −70° C. and −55° C. (A2) preferably comprises from 10 to 20% by weight of styrene and 25 to 35% by weight of vinyl.

The styrene-butadiene (SBR) polymer having a Tg comprised between −35° C. and −25° C. (A3) preferably comprises from 20 to 30% by weight of styrene and from 57 to 67% by weight of vinyl.

The styrene-butadiene polymer (A2) and/or (A3) may contain, in addition to the styrene units and the butadiene units, a small amount, for example, equal to or less than 5% by weight, of additional monomer units such as isoprene, dimethylbutadiene, pentadiene, methylstyrene, ethylstyrene, divinylbenzene and diisopropenylbenzene.

Preferably, the styrene-butadiene polymer (A2) and/or (A3) is a random polymer.

Preferably, the styrene-butadiene polymer (A2) and/or (A3) may have a weight average molecular weight comprised between 180000 and 650000 g/mol, preferably between 200000 and 600000 g/mol.

The styrene-butadiene polymer (A2) and/or (A3) may be prepared according to known techniques, for example as described in US2019062535, in US2019062529 or in U.S. Pat. No. 4,547,560.

In one embodiment, the styrene-butadiene polymer (A2) and/or (A3) is prepared by solution polymerisation (S-SBR).

Typically, solution synthesis provides polymers with a narrow molecular weight distribution, fewer chain branches, higher molecular weight and higher cis-1,4-polybutadiene content than polymers obtainable in emulsion.

In another embodiment, the styrene-butadiene polymer (A2) and/or (A3) is prepared by emulsion polymerisation (E-SBR).

In one embodiment, the styrene-butadiene polymer (A2) and/or (A3) is a random, coupled polymer.

The styrene-butadiene polymer (A2) and/or (A3) may be a functionalised polymer, such as for example the functionalised SBRs described in US2019062535 (par. 9-13), in US2019062529 (par. 19-22) in WO2017/211876A1 (component a) or in WO2015/086039A1.

Typically functionalising groups are alkoxysilanes, mercaptosilanes, sulphur-containing groups, amino groups, amide groups, epoxides, hydroxides and combinations thereof. Suitable alkoxysilane groups include monoalkoxy, dialkoxy, is and trialkoxysilanes. Suitable sulphur-containing groups include thiol, thioether, thioglycol, thioester, sulphide or sulphanilic group. Suitable amino functional groups include the primary, secondary and tertiary amino groups.

In one embodiment, the styrene-butadiene polymer (A2) and/or (A3) is a random, coupled and functionalised polymer.

The elastomeric diene polymers which make up the elastomeric polymer composition (A) are preferably solid.

A commercial example of a suitable type (A2) SBR polymer is Trinseo's SPRINTAN™ SLR 3402.

Commercial examples of suitable (A3) type SBR polymers are Trinseo's SPRINTAN™ SLR 4630, SPRINTAN™ SLR 4602.

The elastomeric composition according to the present invention comprises at least one resin (B).

Preferably, the resin is characterised by a glass transition temperature (Tg) not lower than −25° C., preferably not lower than −5° C. (according to ISO 28343: 2010). The glass transition temperature (Tg) of the resin may be conveniently measured according to the DMA method described in the present experimental part.

Preferably, the resin is characterised by a weight average molecular weight (Mw) of between 500 and 3,000 g/mol, more preferably of between 500 and 2,000 g/mol.

The weight average molecular weight (Mw) of the resin may be measured according to known techniques in the field such as, for example, by SEC (Size-Exclusion Chromatography) according to the ASTM D6579-11 method "Standard Practice for Molecular Weight Averages and Molecular Weight Distribution of Hydrocarbon, Rosin and Terpene Resins by Size-Exclusion Chromatography".

The resin is preferably a non-reactive resin, i.e. a non-crosslinkable polymer, preferably selected from the group comprising hydrocarbon resins, phenolic resins, natural resins and mixtures thereof.

In one embodiment, the resin is a hydrocarbon resin.

The hydrocarbon resin may be aliphatic, aromatic or combinations thereof, meaning that the base polymer of the resin may be formed by of aliphatic and/or aromatic monomers.

The hydrocarbon resin may be natural (e.g. vegetable) or synthetic or derived from petroleum.

Preferably, the hydrocarbon resin is selected from homo- or copolymers of cyclopentadiene (CPD), dicyclopentadiene (DCPD), homo- or copolymers of terpene, homo- or copolymers of the C5 fraction and mixtures thereof, preferably DCPD/vinyl aromatic copolymers, DCPD/terpene copolymers, DCPD/C5 fraction copolymers, terpene/vinyl aromatic copolymers, C5 fractions/vinyl aromatic copolymers and combinations thereof.

Examples of vinyl aromatic monomers include styrene, alpha-methylstyrene, ortho-, meta-, para-methylstyrene, vinyl-toluene, para-terbutylstyrene, methoxy-styrenes, chloro-styrenes, vinyl-mesitylene, divinyl-benzenes, vinyl-naphthalenes, vinyl aromatic monomers derived from the C8-C10 fraction, in particular from C9. Preferably, the hydrocarbon resin is selected from resins derived from coumarone-indene, styrene-indene, styrene-alkylstyrene, and aliphatic resins.

Specific examples of commercially available hydrocarbon resins are NOVARES C resins, manufactured by RUTGERS CHEMICAL GmbH (indene-coumarone synthetic resins) NOVARES C10, C30 and C90 being particularly preferred. Examples of commercially available styrene-indene hydrocarbon resins are UNILENE A 100, manufactured by Braskem, and Novares TL 90, manufactured by Ruetgers.

Examples of commercially available alkyl-styrene hydrocarbon resins are: Sylvares SA 85, manufactured by Arizona Chemical, Kristalex F 85, manufactured by Eastman.

Examples of commercially available aliphatic hydrocarbon resins are: Escorez® 1102 (manufactured by ExxonMobil), Piccotac 1100 (manufactured by Eastman), Quintone A 100 (manufactured by Zeon Chemicals).

In one embodiment, the resin is a phenolic resin.

Preferably, the phenolic resin is selected from among the resins with alkylphenol-formaldehyde base, alkylphenolic resins modified with rosin, resins alkylphenol-acetylene based, modified alkylphenolic resins and terpene-phenol based resins.

Specific examples of commercially available phenolic resins which may be used in the present invention are: RESINA SP-1068 (manufactured by SI GROUP Inc.) (octylphenol-formaldehyde resin); DUREZ 32333 (manufactured by Sumitomo Bakelite) (phenol-formaldehyde resin); KORESIN (manufactured by BASF Company) (p-t-butylphenol-acetylene resin); SYLVARES TP 115 (manufactured by Arizona Chemicals) (terpen-phenolic resin).

In one embodiment, the resin is a natural terpene-based resin.

Preferably, the resin is a polyterpene resin selected from the homo- or copolymers of alpha-pinene, beta-pinene, limonene, and vinyl aromatic monomers (styrene) and/or aromatic monomers (phenol).

Examples of commercial terpene-based natural resins are: Piccolyte F90 and Piccolyte F105, manufactured by PINOVA; Dercolyte A 115 and Dercolyte M 115, manufactured by DRT.

An example of a terpene resin is marketed under the trade name of Dercolyte TS105 (DRT) (terpene and styrene copolymer).

In one embodiment, the resin is a natural rosin-based resin.

The term rosin-based commonly indicates mixtures of isomer organic acids (rosin acids), characterised by a common structure, comprising three C6 fused rings, double bonds in different number and positions and a single carboxylic group.

Examples of rosin-based resins are marketed by DRT under the trade name HYDROGRAL G and DERTOLINE P 105.

In a preferred embodiment, the resin is an alpha-amethylstyrene resin.

Preferably, in the composition according to the invention, the amount of resin (B) is from 7 to 20 phr, more preferably from 10 to 20 phr.

The elastomeric composition according to the present invention comprises at least one plasticising oil (C).

The term "plasticising oil" means a process oil derived from petroleum or a mineral oil or a vegetable oil or a synthetic oil or combinations thereof.

The plasticising oil may be a process oil derived from petroleum selected from paraffins (saturated hydrocarbons), naphthenes, aromatic polycyclic and mixtures thereof.

Examples of suitable process oils derived from petroleum are aromatic, paraffinic, naphthenic oils such as MES (Mild Extract Solvated), DAE (Distillate Aromatic Extract), TDAE (Treated Distillate Aromatic Extract), TRAE (Treated Residual Aromatic Extract), RAE (Residual Aromatic Extract) known in the industry.

The plasticising oil may be an oil of natural or synthetic origin derived from the esterification of glycerol with fatty acids, comprising glycerine triglycerides, diglycerides, monoglycerides or mixtures thereof.

Examples of suitable vegetable oils are sunflower, soybean, linseed, rapeseed, castor and cotton oil.

The plasticising oil may be a synthetic oil selected from among the alkyl or aryl esters of phthalic acid or phosphoric acid.

Preferably, these oils of natural (for example vegetable) or synthetic origin have a glass transition temperature (Tg) lower than −70° C. (according to ISO 28343:2010). Examples of suitable commercial plasticising oils are oils derived from petroleum: NYTEX 4700 marketed by Nynas, EXTENSOIL 1471 marketed by Repsol, VIVATEC 500 marketed by H&R; and vegetable oils: RADIA 6132 marketed by Olean, Agripure AP 18 and Agripure AP 75 marketed by Cargill.

Preferably, in the composition according to the invention, the overall amount of oil (C), which includes both the added oil and that possibly already present as a diluent of the elastomeric polymers, is from 10 to 35 phr, more preferably from 20 to 30 phr. Preferably, the present composition comprises an overall amount of oil (C) higher than 5 phr and lower than 40 phr, more preferably lower than 35 phr.

In the present composition, the total amount of plasticiser, including both the resin (B) and the oil (C), is preferably from 30 to 50 phr.

The elastomeric composition for tyres according to the present invention may comprise at least 20 phr, preferably at least 30 phr, more preferably at least 40 phr, even more preferably at least 50 phr of at least one reinforcing filler (D).

The present composition may comprise from 10 phr to 150 phr, from 30 phr to 120 phr or from 40 phr to 100 phr of at least one reinforcing filler (D).

Preferably, the present composition comprises an amount of reinforcing filler (D) higher than 1 phr and lower than 120 phr, more preferably lower than 100 phr.

Preferably, the reinforcing filler (D) is selected from carbon black, white fillers, silicate fibres or mixtures thereof.

In an embodiment, said reinforcing filler (D) is a white filler selected from among hydroxides, oxides and hydrated oxides, salts and hydrated salts of metals, silicates fibres or mixtures thereof. Preferably, said white filler is silica.

Preferably, said silica is present in the elastomeric composition in an amount comprised between 10 phr and 130 phr, more preferably between 40 phr and 110 phr, even more preferably between 70 and 100 phr.

Commercial examples of suitable conventional silica are Zeosil 1165 MP from Solvay, and Ultrasil 7000 GR from Evonik.

In one embodiment, said reinforcing filler (D) is carbon black.

Preferably, said carbon black is present in the elastomeric composition in an amount comprised between 1 phr and 100 phr, more preferably between 5 phr and 70 phr, even more preferably between 5 and 10 phr.

Preferably, the carbon black is selected from those having a surface area not smaller than 20 $m^2/g$, preferably larger than 50 $m^2/g$ (as determined by STSA—statistical thickness surface area according to ISO 18852:2005).

The carbon black may be, for example, N234, N326, N330, N375 or N550, N660 marketed by Birla Group (India) or by Cabot Corporation.

Preferably, the reinforcing filler comprises carbon black and silica, in particular preferably from 2 to 15 phr of carbon black and from 40 to 110 phr of silica, more preferably from 5 to 10 phr of carbon black and from 70 to 100 phr of silica. The elastomeric composition for tyre compounds according to the invention preferably comprises at least 0.7 phr, more preferably at least 1 phr of at least one vulcanising agent (E).

The elastomeric composition for tyre compounds according to the invention preferably comprises from 0.5 to 7 phr, more preferably from 1 to 5 phr of a vulcanising agent (E).

The at least one vulcanising agent (E) is preferably selected from sulphur, or alternatively, sulphur-containing molecules (sulphur donors), such as for example bis(trialcoxysilyl)propyl]polysulphides and mixtures thereof.

Preferably, the vulcanising agent (E) is sulphur, preferably selected from soluble sulphur (crystalline sulphur), insoluble sulphur (polymeric sulphur), (iii) oil-dispersed sulphur and mixtures thereof.

Commercial example of vulcanising agent (E) suitable for use in the elastomeric composition of the invention is the Redball Superfine sulphur of International sulphur Inc.

In the present elastomeric composition, the vulcanising agent (E) may be used together with adjuvants such as vulcanisation activators, accelerants and/or retardants known to those skilled in the art.

The elastomeric composition according to the invention may optionally comprise at least one vulcanisation activator.

The vulcanisation activating agents suitable for use in the present elastomeric composition are zinc compounds, in particular ZnO, $ZnCO_3$, zinc salts of saturated or unsaturated fatty acids containing from 8 to 18 carbon atoms, which are preferably formed in situ in the elastomeric composition by reaction of ZnO and of the fatty acid or mixtures thereof. For example, zinc stearate is used, preferably formed in situ in the elastomeric composition, by ZnO and fatty acid, or magnesium stearate, formed by MgO, or mixtures thereof.

The vulcanisation activating agents may be present in the elastomeric composition of the invention in amounts preferably from 0.2 phr to 15 phr, more preferably from 1 phr to 5 phr.

Preferred activating agents derive from the reaction of zinc oxide and stearic acid.

An example of activator is the product Aktiplast ST marketed by Rheinchemie.

The elastomeric composition according to the invention may further comprise at least one vulcanisation accelerant.

Vulcanisation accelerants that are commonly used may be for example selected from dithiocarbamates, guanidines, thioureas, thiazoles, sulphenamides, sulphenimides, thiurams, amines, xanthates, or mixtures thereof.

Preferably, the accelerant agent is selected from mercaptobenzothiazole (MBT), N-cyclohexyl-2-benzothiazol-sulphenamide (CBS), N-tert-butyl-2-benzothiazol-sulphenamide (TBBS) and mixtures thereof.

Commercial examples of accelerants suitable for use in the present elastomeric composition are N-cyclohexyl-2-benzothiazyl-sulphenamide Vulkacit® (CBS or CZ), and N-terbutyl 2-benzothiazil sulphenamide, Vulkacit® NZ/EGC marketed by Lanxess.

Vulcanisation accelerants may be used in the present elastomeric composition in an amount preferably from 0.05 phr to 10 phr, preferably from 0.1 phr to 7 phr, more preferably from 0.5 phr to 5 phr.

The elastomeric composition according to the invention may optionally comprise at least one vulcanisation retardant agent.

The vulcanisation retardant agent suitable for use in the present elastomeric composition is preferably selected from urea, phthalic anhydride, N-nitrosodiphenylamine N-cyclohexylthiophthalimide (CTP or PVI) and mixtures thereof.

A commercial example of a suitable retardant agent is N-cyclohexylthiophthalimide VULKALENT G of Lanxess.

The vulcanisation retardant agent may be present in the present elastomeric composition in an amount of preferably from 0.05 phr to 2 phr.

The present elastomeric composition may comprise one or more vulcanisation retardant agents as defined above in a mixture.

The elastomeric composition according to the invention may further comprise at least 0.05 phr, preferably at least 0.1 phr or 0.5 phr, more preferably at least 1 phr or 2 phr of at least one silane coupling agent.

Preferably, the elastomeric composition according to the invention comprises from 0.5 phr to 10.0 phr, more preferably or from 1.0 phr to 8.0 phr, even more preferably from 5 to 8 phr of at least one silane coupling agent.

Preferably, said coupling agent is a silane coupling agent selected from those having at least one hydrolysable silane group which may be identified, for example, by the following general formula (III):

$$(R')_3Si—C_nH_{2n}—X \qquad (III)$$

wherein the groups R', equal or different from each other, are selected from: alkyl, alkoxy or aryloxy groups or from halogen atoms, provided that at least one of the groups R' is an alkoxy or an aryloxy group; n is an integer of from 1 to 6; X is a group selected from: nitrose, mercapto, amino, epoxide, vinyl, imide, chloro, $—(S)_mC_nH_{2n}—Si—(R')_3$ and —S—COR', wherein m and n are integers of from 1 to 6 and the groups A' are as defined above.

Particularly preferred silane coupling agents are bis(3-triethoxysilylpropyl)tetrasulphide and bis(3-triethoxysilylpropyl)disulphide. Said coupling agents may be added as such or in mixture with an inert filler (such as carbon black) so as to facilitate their incorporation into the elastomeric composition. An example of the silane coupling agent is TESPT: bis(3-triethoxysilylpropyl)tetrasulphide Si69 marketed by Evonik.

The elastomeric composition according to the invention may further comprise one or more additional ingredients, commonly used in the field, such as for example antioxidant and/or antiozonating agents (anti-aging agents), waxes, adhesives and the like.

The elastomeric composition according to the invention may optionally comprise at least one wax.

The wax may be for example a petroleum wax or a mixture of paraffins.

Commercial examples of suitable waxes are the Repsol N-paraffin mixture and the Antilux® 654 microcrystalline wax from Rhein Chemie, The wax may be present in the elastomeric composition of the invention in an overall amount generally from 0.1 phr to 20 phr, preferably from 0.5 phr to 10 phr, more preferably from 1 phr to 5 phr.

The elastomeric composition according to the invention may optionally comprise at least one antioxidant agent.

The antioxidant agent is preferably selected from N-isopropyl-V-phenyl-p-phenylenediamine (IPPD), N-(-1,3-dimethyl-butyl)-n'-phenyl-p-phenylenediamine (6PPD), N,N'-bis-(1,4-dimethyl-pentyl)-p-phenylenediamine (77PD), N,N'-bis-(1-ethyl-3-methyl-pentyl)-p-phenylenediamine (DOPD), N,N'-bis-(1,4-dimethyl-pentyl)-p-phenylenediamine, N,N'-diphenyl-p-phenylenediamine (DPPD), N,N'-ditolyl-p-phenylenediamine (DTPD), N,N'-di-beta-naphthyl-p-phenylenediamine (DNPD), N,N'-bis(1-methylheptyl)-p-phenylenediamine, N,N'-Di-sec-butyl-p-phenylenediamine (44PD), N-phenyl-N-cyclohexyl-p-phenylenediamine, N-phenyl-N'-1-methylheptyl-p-phenylenediamine and the like, and mixtures thereof, preferably it is N-1,3-dimethylbutyl-N-phenyl-p-phenylenediamine (6-PPD).

A commercial example of a suitable antioxidant agent is 6PPD from Solutia/Eastman or Santoflex produced by Flexsys.

The antioxidant agent may be present in the elastomeric composition in an overall amount preferably from 0.1 phr to 20 phr, preferably from 0.5 phr to 10 phr.

A further aspect of the present invention is a vulcanised elastomeric compound for tyres obtained by mixing and vulcanising the elastomeric composition according to the invention.

The elastomeric compound is typically characterised by two Tg peaks corresponding to two different glass transitions.

Preferably, the compound is characterised by at least a first glass transition temperature Tg1 comprised between −65 and −40° C., more preferably between −60 and −45° C., even more preferably between −55 and −50° C. and by at least one second glass transition temperature Tg2 comprised between −45 and −15° C., more preferably between −40 and −20° C., even more preferably between −35 and −25° C., measured as described in the present experimental part.

The present elastomeric compound may be prepared according to a conventional process which typically comprises one or more mixing steps in at least one suitable mixer, in particular at least one mixing step 1 (non-productive) and a mixing step 2 (productive) as defined above.

Each mixing step may comprise several intermediate processing steps or sub-steps, characterised by the momentary interruption of the mixing to allow the addition of one or more ingredients but without intermediate discharge of the compound.

The mixing may be performed, for example, using an open mixer of the "open-mill" type or an internal mixer of the type with tangential rotors (Banbury®) or with interpenetrating rotors (Intermix), or in continuous mixers of the Ko-Kneader™ type (Buss®) or of the twin-screw or multi-screw type.

The elastomeric compounds may then be vulcanised according to known techniques. To this end, after one or more thermomechanical processing steps, the vulcanising agent (E) is incorporated in the materials, together with any vulcanisation accelerants and/or retardants. In the final treatment step (production step 2), the temperature is generally kept below 120° C. and preferably below 100° C., so as to prevent any undesired pre-vulcanisation phenomena. Thereafter, the vulcanisable compound is incorporated in one or more components of the tyre and subjected to vulcanisation, according to known techniques.

A further aspect of the present invention is a tyre component for vehicle wheels comprising, or preferably consisting of, an elastomeric compound, according to the invention, preferably selected from the tread band, under-layer, anti-abrasive layer, sidewall, sidewall insert, mini-sidewall, liner, under-liner, rubber layers, bead filler, bead reinforcing layers (flipper), bead protection layers (chafer), sheet. Preferably, the tyre component is a tread band.

A further aspect of the present invention is a tyre for vehicle wheels comprising at least one of the components according to the invention indicated above.

Preferably, said component is a tread band.

In one embodiment, a tyre for vehicles according to the present invention comprises at least

- a carcass structure comprising at least a carcass ply having opposite lateral edges associated to respective bead structure;
- possibly a pair of sidewalls applied to the lateral surfaces of the carcass structure, respectively, in an axially outer position;
- possibly a belt structure applied in radially outer position with respect to the carcass structure;
- a tread band applied in a radially outer position to said carcass structure or, if present, a belt structure,
- possibly a layer of elastomeric material, referred to as under-layer, applied in a radially inner position with respect to said tread band, wherein at least one component, preferably the tread band, comprises, or preferably consists of, the elastomeric compound according to the invention.

The tyre according to the invention is typically an all-season tyre.

In one embodiment, the tyre according to the invention is a tyre for automobile. Preferably, at least the tread band comprises the elastomeric compound according to the invention.

In one embodiment, the tyre according to the invention is a tyre for motorcycles, wherein at least one component comprises, or preferably consists of, the elastomeric compound according to the invention. Preferably, at least the tread band comprises the elastomeric compound according to the invention.

The tyre according to the invention may be a tyre for two, three or four-wheeled vehicles.

The tyre according to the present invention may be produced according to a process which comprises;

- building components of a green tyre on at least one forming drum;
- shaping, moulding and vulcanising the tyre;

wherein building at least one of the components of a green tyre comprises:

- manufacturing at least one green component, preferably the tread band, comprising, or preferably consisting of, the elastomeric composition of the invention.

Description of a Tyre According to the Invention

A tyre for vehicle wheels according to the invention, comprising at least one component comprising the present elastomeric compound, is illustrated in radial half-section in FIG. 1.

In FIG. 1, "a" indicates an axial direction and "X" indicates a radial direction, in particular X-X indicates the outline of the equatorial plane. For simplicity, FIG. 1 shows only a portion of the tyre, the remaining portion not shown being identical and arranged symmetrically with respect to the equatorial plane "X-X".

The tyre (100) for four-wheeled vehicles comprises at least one carcass structure, comprising at least one carcass layer (101) having respectively opposite end flaps engaged with respective annular anchoring structures (102), referred to as bead cores, possibly associated to a bead filler (104).

The tyre area comprising the bead core (102) and the filler (104) forms a bead structure (103) intended for anchoring the tyre onto a corresponding mounting rim, not shown.

The carcass structure is usually of radial type, i.e. the reinforcing elements of the at least one carcass layer (101) lie on planes comprising the rotational axis of the tyre and substantially perpendicular to the equatorial plane of the tyre. Said reinforcing elements generally consist of textile cords, such as rayon, nylon, polyester (for example polyethylene naphthalate, PEN). Each bead structure is associated to the carcass structure by folding back of the opposite lateral edges of the at least one carcass layer (101) around the annular anchoring structure (102) so as to form the so-called carcass flaps (101*a*) as shown in FIG. 1.

In one embodiment, the coupling between the carcass structure and the bead structure may be provided by a second carcass layer (not shown in FIG. 1) applied in an axially outer position with respect to the first carcass layer.

An anti-abrasive strip (105) possibly made with elastomeric material is arranged in an outer position of each bead structure (103).

The carcass structure is associated to a belt structure (106) comprising one or more belt layers (106*a*), (106*b*) placed in radial superposition with respect to one another and with respect to the carcass layer, having typically textile and/or metallic reinforcing cords incorporated within a layer of elastomeric material.

Such reinforcing cords may have crossed orientation with respect to a direction of circumferential development of the tyre (100). By "circumferential" direction it is meant a direction generally facing in the direction of rotation of the tyre.

At least one zero-degree reinforcing layer (106*c*), commonly known as a "0° belt", may be applied in a radially outermost position to the belt layers (106*a*), (106*b*), which generally incorporates a plurality of elongated reinforcing elements, typically metallic or textile cords, oriented in a substantially circumferential direction, thus forming an angle of a few degrees (such as an angle of between about 0° and 6°) with respect to a direction parallel to the equatorial plane of the tyre, and coated with an elastomeric material.

A tread band (109) comprising the elastomeric compound according to the invention is applied in a position radially outer to the belt structure (106).

Moreover, respective sidewalls (108) of elastomeric material are applied in an axially outer position on the lateral surfaces of the carcass structure, each extending from one of the lateral edges of tread (109) at the respective bead structure (103).

In a radially outer position, the tread band (109) has a rolling surface (109*a*) intended to come in contact with the ground. Circumferential grooves, which are connected by transverse notches (not shown in FIG. 1) so as to define a plurality of blocks of various shapes and sizes distributed over the rolling surface (109*a*), are generally made on this surface (109*a*), which for simplicity is represented smooth in FIG. 1.

An under-layer (111) of elastomeric material may be arranged between the belt structure (106) and the tread band (109).

A strip consisting of elastomeric material (110), commonly known as "mini-sidewall", may optionally be provided in the connecting zone between the sidewalls (108) and the tread band (109), this mini-sidewall being generally obtained by co-extrusion with the tread band (109) and allowing an improvement of the mechanical interaction between the tread band (109) and the sidewalls (108). Preferably, the end portion of the sidewall (108) directly covers the lateral edge of the tread band (109).

In the case of tubeless tyres, a rubber layer (112), generally known as "liner", which provides the necessary impermeability to the inflation air of the tyre, may also be provided in a radially inner position with respect to the carcass layer (101).

The rigidity of the tyre sidewall (108) may be improved by providing the bead structure (103) with a reinforcing layer (120) generally known as flipper or additional strip-like insert.

The flipper (120) is a reinforcing layer which is wound around the respective bead core (102) and the bead filler (104) so as to at least partially surround them, said reinforcing layer being arranged between the at least one carcass layer (101) and the bead structure (103). Usually, the flipper is in contact with said at least one carcass layer (101) and said bead structure (103).

The flipper (120) typically comprises a plurality of textile cords incorporated within a layer of elastomeric material.

The reinforcing annular structure or bead (103) of the tyre may comprise a further protective layer which is generally known by the term of "chafer" (121) or protective strip and which has the function of increasing the rigidity and integrity of the bead structure (103).

The chafer (121) usually comprises a plurality of cords incorporated within a rubber layer of elastomeric material. Such cords are generally made of textile materials (such as aramide or rayon) or metal materials (such as steel cords).

A layer or sheet of elastomeric material may be arranged between the belt structure and the carcass structure. The layer may have a uniform thickness. Alternatively, the layer may have a variable thickness in the axial direction. For example, the layer may have a greater thickness close to its axially outer edges with respect to the central (crown) zone.

Advantageously, the layer or sheet may extend on a surface substantially corresponding to the extension surface of said belt structure.

In a preferred embodiment, a layer of elastomeric material, referred to as under-layer, may be placed between said belt structure and said tread band, said under-layer preferably extending on a surface substantially corresponding to the extension surface of said belt structure.

The elastomeric compound according to the present invention may advantageously be incorporated in one or more of the above tyre components, preferably in the tread band.

The building of the tyre (100) as described above, may be carried out by assembling respective semi-finished products adapted to form the components of the tyre, on a forming drum, not shown, by at least one assembling device.

At least a part of the components intended to form the carcass structure of the tyre may be built and/or assembled on the forming drum. More particularly, the forming drum is intended to first receive the possible liner, and then the carcass structure. Thereafter, devices non shown coaxially engage one of the annular anchoring structures around each of the end flaps, position an outer sleeve comprising the belt structure and the tread band in a coaxially centred position around the cylindrical carcass sleeve and shape the carcass sleeve according to a toroidal configuration through a radial expansion of the carcass structure, so as to cause the application thereof against a radially inner surface of the outer sleeve.

After the building of the green tyre, a moulding and vulcanisation treatment is generally carried out in order to determine the structural stabilisation of the tyre through cross-linking of the elastomeric compositions, as well as to impart a desired tread pattern on the tread band and at any distinguishing graphic signs at the sidewalls.

Experimental Part

Methods of Analysis

Scorching time (Scorch): it is the time required, expressed in minutes, to have a +5 points increase in Mooney viscosity, measured according to ISO 289-2 (1994), at 127° C.

Viscosity: the measurement was carried out at 100° C. on the final elastomeric composition before vulcanisation according to the ISO 289-1 (1994) procedure.

Glass transition temperature (Tg): The glass transition temperature Tg of the elastomeric polymers and of the vulcanised compounds, determined on the peak value of the Tan Delta, was measured by dynamo-mechanical analysis (DMA). In detail, the samples were analysed with an EPLEXOR® 150 (GABO) device by carrying out a temperature scan from −80° C. to +30° C. with temperature increases of 2° C./min, applying a dynamic tensile deformation of the 0.1% at a frequency of 1 Hz. The specimens had the following dimensions: thickness 1 mm, width 10 mm, length 46 mm, reference length 29 mm (represents the free length that participates in the deformation while the two clamps block the ends of the specimen).

MDR rheometric analysis: the analysis was carried out according to the ISO 6502 method, with an Alpha Technologies model MDR2000 rheometer, at 170° C. and for 30 minutes.

The applied oscillation frequency was 1.66 Hz with an oscillation width of ±0.5°. The time required to achieve an increase of two rheometric units (TS2) and to respectively reach 30% (T30), 60% (T60) and 90% (T90) of the maximum torque MH was measured. The maximum torque value MH and the minimum torque value ML were also measured.

Stress deformation properties: the static mechanical properties were measured according to ISO 37:2005, on O-rings. Strength was evaluated at different elongations (100% and 300%, respectively, CA1 and CA3).

CR (load at break) and AR (elongation at break) were also measured.

IRHD hardness: IRHD hardness (23° C.) was measured on vulcanised compounds according to ISO 48: 2007.

Dynamic Mechanical Analysis (MTS): the dynamic mechanical properties were measured using an Instron dynamic device in compression and tension operation by the following method. A sample of vulcanised elastomeric cylindrical compositions (height=25 mm; diameter=14 mm), preload in compression up to 25% of longitudinal deformation with respect to the initial length and maintained at the predetermined temperature (−10° C., 23° C. or 70° C.) during the test was subjected to a dynamic sinusoidal voltage with amplitude±3.5% with respect to the length of the preload, at a frequency of 100 Hz.

The dynamic mechanical properties are expressed in terms of dynamic elastic modulus (E') and Tan delta (loss factor). The Tan delta value was calculated as the ratio between the viscous dynamic module (E") and the dynamic elastic modulus (E').

Abrasion: abrasion resistance was evaluated according to DIN 53516, where the sample is forced against a rotating drum and the weight loss (mg) is measured. The lower the value, the greater the abrasion resistance of the sample.

Rolling resistance (RR): measured according to UNECE reg. 117 Rev. 4 annex 6-ISO28580 (2018) (par. 4b—torque method)—Notification n. 2011-237 (Korea).

Example 1

All-season (AS) tread compounds were prepared with binary and ternary compositions of elastomeric polymers, in particular natural rubber (NR) and SBR at different Tg, to evaluate the miscibility of elastomeric polymers, the pattern of the Tg of the compound and the appearance of the double hysteresis peak, depending on the nature of the elastomeric polymers and their ratio. The polymers used and their features are shown in the following Table 1;

TABLE 1 elastomeric polymers

| | Type | Notes | Tg |
|---|---|---|---|
| S-SBR1 | Solution-functionalised Styrene Butadiene copolymer | 15% Styrene 30% Vinyl* | −62° C. |
| S-SBR2 | Styrene Butadiene copolymer from solution (extended oil) | 25% Styrene 63% Vinyl* | −28° C. |
| S-SBR3 | Styrene Butadiene copolymer from solution >96% Cis | 21% Styrene 62% Vinyl | −25° C. |
| BR | Polybutadiene (extended oil) >96% Cis | | −106° C. |
| NR | Natural rubber | | −65° C. |

*with respect to the butadiene fraction wherein

- NR is the Indonesian natural rubber SIR20 from ANEKA BUMI PRATAMA, SED (maximum impurity 0.20%);
- S-SBR1 is SPRINTAN™ SLR 3402-SCHKOPAU from Trinseo is a partially coupled and functionalised styrene-butadiene rubber, produced by anionic solution polymerisation using an organo-lithium initiator;
- S-SBR2 is SPRINTAN™ SLR 4630-SCHKOPAU from Trinseo, a partially Si-coupled styrene-butadiene rubber produced by anionic solution polymerisation using an organo-lithium initiator; extended with 37.5 parts of TDAE oil per every 100 parts of dry polymer;
- S-SBR3 is SPRINTAN™ SLR 4602-SCHKOPAU from Trinseo, a partially coupled butadiene-styrene rubber produced by anionic polymerisation in solution with an organo-lithium initiator;
- BR is Buna® CB 29 MES from ARLANXEO, a neodymium butadiene rubber, extended with 37.5 phr of MES oil per 100 parts of dry polymer.

The following Table 2 shows the recipes of the elastomeric compositions A-E and the steps for adding the components:

TABLE 2 elastomeric compositions A-E (phr)

| Step | | Components A Comp. | B Comp. | C Comp. | D Comp. | E Inv. |
|---|---|---|---|---|---|---|
| 1-0 | NR (−65° C.) | 50 | 50 | — | 33.5 | 50 |
| 1-0 | S-SBR1 (Tg −62° C.) | 50 | — | 50 | 33.5 | 30 |
| 1-0 | S-SBR2 (Tg −28° C.) | — | 50/68.8 | 50/68.8 | 33/45.8 | 20/27.5 |
| 1-1 | Carbon black | 7 | 7 | 7 | 7 | 7 |
| 1-1 | Silica | 80 | 80 | 80 | 80 | 80 |
| 1-1 | Coupling agent | 6.4 | 6.4 | 6.4 | 6.4 | 6.4 |
| 1-1 | Oil | 25 | 15 | 15 | 30 | 20 |
| 1-1 | Resin | 17.5 | 8.7 | 8.7 | 10 | 15 |
| 1-2 | Stearic acid | 1.5 | 1.5 | 1.5 | 1.5 | 1.5 |
| 1-2 | Zn oxide | 2 | 2 | 2 | 2 | 2 |
| 1-2 | Wax | 1.5 | 1.5 | 1.5 | 1.5 | 1.5 |
| 1-2 | Antidegradant | 5 | 5 | 5 | 5 | 5 |
| 2-0 | Accelerants | 2.5 | 2.5 | 2.5 | 2.5 | 2.5 |
| 2-0 | Sulphur | 1.2 | 1.2 | 1.2 | 1.2 | 1.2 |
| | Total oil (including oil from S-SBR2) | 25 | 33.8 | 33.8 | 42.8 | 27.5 |
| | Total plasticiser (total oil + resin) | 42.5 | 42.5 | 42.5 | 52.8 | 42.5 |

Comp. = comparative;
Inv. = according to the invention wherein:

S-SBR2 is extended with 37.5 phr of oil per 100 phr of polymer (the table shows the phr of net polymer/the phr of polymer+oil)

Carbon black: N234 from Cabot Corporation; Silica—ZEOSIL 1165 MP, standard grade with surface area of about 175 $m^2/g$ from Solvay; coupling agent: bis[3-(triethoxysilyl)propyl]tetrasulphide JH-569 from ChemSpec Ltd.; Oil-MES (Mild Exctract Solvated) CLEMATIS MS from EM; IMPERA P1504 alpha-amethylstyrene resin from EASTMAN (Tg 80-90° C.); ZnO: Standard Zn oxide from A-Esse; to Antidegradant: SANTOFLEX 6 PPD from EASTMAN; Accelerant: N-cyclohexylbenzothiazole-2-sulphenamide RUBENAMID C EG/C from GENERAL QUIMICA.

The comparative composition A included natural rubber and a lower Tg (−62° C.)S-SBR as taught in US2019062529.

The comparative composition B included natural rubber and a higher Tg (−28° C.) 5-SBR as taught in US2019062535.

The elastomeric compositions were prepared according to the following process.

The mixing of the components was carried out in several steps using a Banbury mixer.

In the first step (1-0), at a rotor speed of 75 rpm and a temperature of 40° C., the elastomers were introduced and pre-chewed for 20 seconds, followed by the incorporation for 45 seconds of the coupling agent and the filler.

Subsequently in step (1.1) the oil and resin were added and mixed for 60 seconds, at 140° C. In step (1-2), stearic acid, Zn oxide, wax and antidegradant were incorporated, keeping the rotor speed at 75 rpm and bringing the temperature to 50° C. for 75 seconds.

Subsequently, after a cleaning step, mixing continued for 135 seconds at the discharge temperature of 125° C., after which the compounds—called first step compounds—were discharged.

Finally, in the final step (2), a temperature of 40° C. and a rotor speed of 50 rpm were set, and the vulcaniser (Sulphur) and the accelerant were added, continuing the mixing for 30 seconds. After another cleaning step, mixing was resumed for a further 90 seconds at the final discharge temperature of 110° C., when the final green compounds were discharged and tested.

The main physical properties of the elastomeric compounds A-E are shown in the following Table 3:

TABLE 3

| | A | B | C | D | E |
|---|---|---|---|---|---|
| Tg (° C.) compounds | −44.0 | −14.0 | −24.0 | −24.5 | −30.0/−53.0 |
| Scorching time (min.) 127° C. | 19.0 | 15.4 | 15.9 | 15.9 | 17.8 |
| Viscosity ML (1 + 4)' 100° C. (KPa) | 68.0 | 86.8 | 118.3 | 101.9 | 73.1 |
| MDR | | | | | |
| ML (dNm) | 3.5 | 4.7 | 5.3 | 5.2 | 3.9 |
| MH (dNm) | 22.6 | 26.1 | 30.5 | 29.1 | 23.6 |
| TS2 (min.) | 0.9 | 0.7 | 0.9 | 0.8 | 0.8 |
| T30 (min.) | 1.4 | 1.3 | 1.6 | 1.4 | 1.4 |
| T60 (min.) | 1.8 | 1.6 | 2.2 | 1.8 | 1.7 |
| T90 (min.) | 2.9 | 3.0 | 7.4 | 4.2 | 3.0 |
| Density | 1.184 | 1.197 | 1.201 | 1.201 | 1.187 |
| IRHD hardness | 77.8 | 81.0 | 81.1 | 81.1 | 78.2 |
| DIN abrasion (mg) | 56.5 | 61.3 | 88.0 | 65.5 | 58.7 |
| Static properties | | | | | |
| Ca1 (MPa) | 2.2 | 2.8 | 3.4 | 3.0 | 2.4 |
| Ca3 (MPa) | 9.9 | 12.0 | 15.4 | 12.9 | 10.3 |
| CR (MPa) | 17.7 | 15.5 | 17.7 | 18.4 | 17.4 |
| AR (%) | 494 | 398 | 362 | 426 | 475 |
| Dynamic properties | | | | | |
| E' 100 Hz/−10° C. (MPa) | 14.2 | | 23.9 | 23.9 | 17.1 |
| Tan Delta 100 Hz/−10° C. | 0.580 | | 0.762 | 0.745 | 0.675 |
| E' 100 Hz/23° C. (MPa) | 9.0 | 12.1 | 12.4 | 12.3 | 9.8 |
| Tan Delta 100 Hz/23° C. | 0.277 | 0.406 | 0.371 | 0.361 | 0.319 |
| E' 100 Hz/70° C. (MPa) | 6.4 | 7.6 | 8.1 | 7.9 | 6.6 |
| Tan Delta 100 Hz/70° C. | 0.159 | 0.171 | 0.165 | 0.168 | 0.166 |

The samples, tested under vulcanisation conditions, were vulcanised with different geometries according to the requirements of the respective measurement method. The vulcanisation was carried out with a hydraulic press at 200 bar, 170° C. temperature and for 10 minutes.

From the data reported in Table 3 it may be seen that all the compounds showed t-points, as per ISO 6502 method, in line with the vulcanisation conditions, therefore the evaluation of hardness and abrasion appeared to be correct. Furthermore, the static and dynamic properties were in agreement with the expected data for compound compositions for treads.

Figure 2:
FIG. 2 shows the Tan delta pattern of the elastomeric compounds obtained by vulcanisation of the comparative compositions A-D and according to the invention E, as the temperature varies.

The pattern of the Tan delta as the temperature of the elastomeric compounds obtained by vulcanisation of the A-E compositions varies is shown in FIG. 2. From this graph it was observed that:

Compound A—the compound comprising the binary mixture of NR and SBR at low Tg showed a single Tg and a single Tan delta peak, miscibility index and a single transition at lower temperatures (−44° C.) (compound for snow). The hysteresis at higher temperatures was lower than that of the other compounds (B-E), predicting poor tyre performance in terms of grip in both wet and dry conditions.

Compound B—the compound comprising the binary mixture of NR and SBR at Tg=−28° C. showed a high Tg with a high hysteresis peak at about −14° C. (summer compound). This peak predicted good tyre grip in both wet and dry conditions but limited grip on snow.

Compound C—the compound comprising the binary mixture of the two SBRs—at low and high Tg—showed a single glass transition and Tan delta peak at intermediate temperatures (−24° C.). This hysteresis pattern predicted intermediate tyre behaviour in snow, wet and dry conditions, with poor performance in each.

Compound D—the compound comprising the ternary mixture of NR and the two SBRs—at low and high Tg —, showed a single transition peak, miscibility index of the polymers, at an intermediate temperature (−24.5° C.) comparable to that of Compound C. The corresponding pattern of the hysteresis of the compound predicted an intermediate behaviour of the tyre in snow, wet and dry conditions, with poor performance in each.

Compound E—the compound according to the invention comprising the ternary mixture of 50 phr of NR, 30 phr of S-SBR1 at the lowest Tg and 27.5 phr of S-SBR2 at the highest Tg, showed two distinct transition peaks at −53° C. and −30° C., immiscibility index of the polymers, and higher Tan Delta values at the higher temperatures than the winter compound A.

This hysteresis pattern predicted good tyre behaviour in snow, wet and dry conditions, with improved performance in each.

Figure 3A:
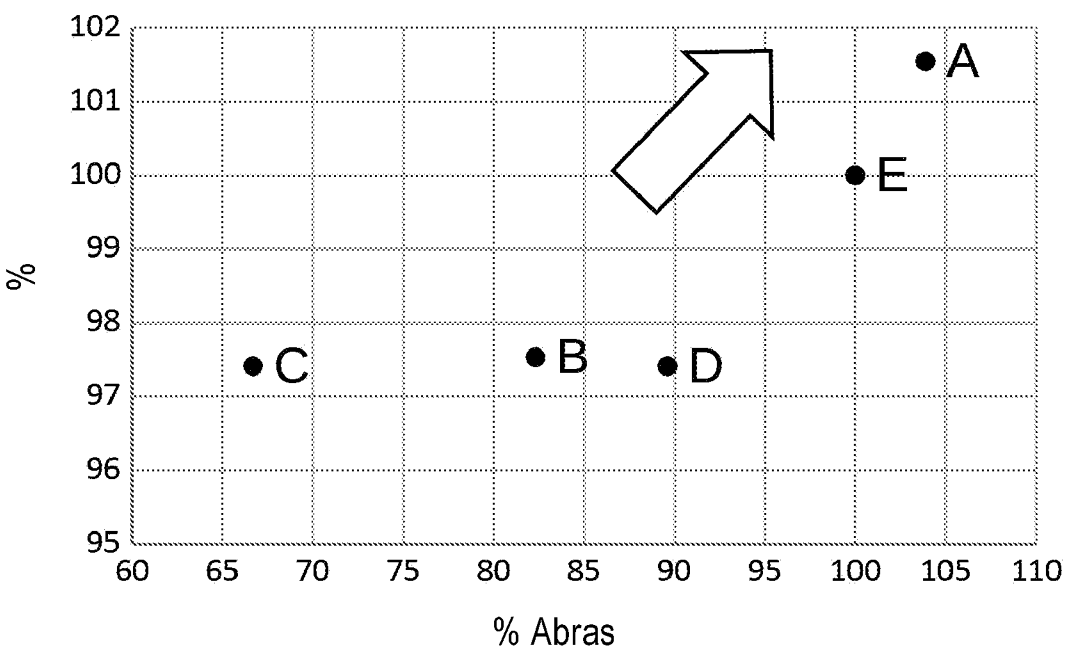
FIG. 3A and FIG. 3B show on the ordinate the hardness values (at 23° C.) and the average of the Tan Delta at −10° C. and +23° C., indicative of the performance on snow (FIG. 3A) and on wet (FIG. 3B), respectively, and, on the abscissa, the abrasion values (mg) indicative of wear, of compounds A E, reparameterized by setting the values measured for compound E equal to 100, where the arrow points towards the best performance.
Figure 3B:
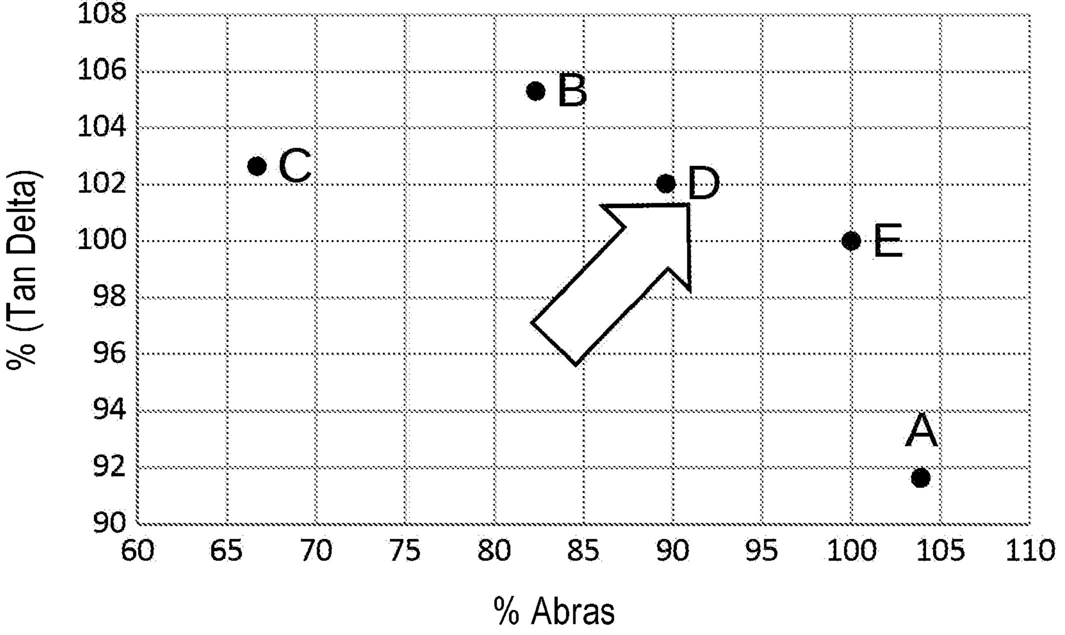

FIG. 3A and FIG. 3B respectively report the hardness and mean values of the Tan Delta values at −10° C. and +23° C. with respect to the abrasion of compounds A-E, predictive of performance in snow conditions, of wet and tyre wear, re-measured by setting to 100 the values measured for compound E.

In particular, FIG. 3A is representative of the balance of performance on snow vs wear while FIG. 3B of the balance of performance on wet vs wear. The arrows indicate the best values for each performance pair.

From the diagrams it may be seen that compound A showed the best performance balance in terms of grip on snow and wear but appeared the most lacking in the wet.

Compound B had the best balance of wet grip and wear but lacked in terms of snow performance.

Compounds C and D appeared poor in all performances.

Compound E according to the invention, on the other hand, showed the best balance of performance on snow, in the wet and of wear due to the double hysteresis peak. In fact, the peak at a lower temperature was predictive of a good grip on snow together with less wear of the tyre while the peak at the higher temperature allowed a good performance to be predicted even in the wet.

From the data shown by the compounds A—E under study, it could be deduced that the double peak pattern of the hysteresis could only be obtained by using elastomeric polymers that had a different Tg and remained immiscible in the specific ratios.

For example, in the case of the comparative compounds A, B, C, despite having different elastomeric polymers Tg, a single hysteresis peak was obtained since in those conditions the elastomeric polymers were miscible.

The immiscibility of the elastomeric polymers and therefore the obtaining of the double peak in the hysteresis was therefore not only a function of the type of elastomeric polymers but also of their amounts, as evidenced by comparing the compound D (single Tan delta peak) with the compound E (double Tan delta peak), comprising the same polymers but in different amounts.

Example 2

Similarly to what was previously described in Example 1, a compound similar to compound E was prepared, replacing the natural rubber NR with the same amount of the butadiene rubber BR shown in Table 1.

From the measurement of the Tan delta upon the variation of temperature carried out on samples of this compound, the presence of the double peak was not observed but only of a single transition peak at about −46° C., index of the miscibility of the elastomeric polymers.

Example 3

Similarly to what was previously described in Example 1, a compound similar to compound E was prepared by replacing S-SBR1 and S-SBR2 prepared in solution with equal amounts of SBR analogues prepared in emulsion (E-SBR1 and E-SBR2). The pattern of the Tan delta curve as the temperature of this compound varies remained substantially unchanged with respect to compound E, demonstrating that the splitting of the peak did not depend on the preparation method of the SBR polymer.

Example 4

Similarly to what was previously described in Example 1, other compounds were prepared according to the invention F-I, by varying the ratios between the natural rubber NR and the two polymers S-SBR1 and S-SBR2, observing, for all of them, two distinct vitreous transitions and the splitting of the Tan delta peak.

On the basis of the observations on the compounds of Example 1, where a compound comprising the three elastomeric polymers, each at 33% by weight (compound D) was not able to provide the double peak of the hysteresis, in these tests an amount of NR of at least 40 phr was maintained. Furthermore, it was decided not to exceed 65 phr of NR as for larger amounts, while improving the performance on snow, those in the wet became poor.

The following Table 4 shows the recipes of the elastomeric compositions E-I and the step for adding the components:

TABLE 4

Elastomeric compositions E-I (phr)

| Step | | Components | | | | |
|---|---|---|---|---|---|---|
| | | E | F | G | H | I |
| 1-0 | NR | 50 | 40 | 40 | 60 | 60 |
| 1-0 | S-SBR1 (Tg −62° C.) | 30 | 40 | 30 | 20 | 30 |
| 1-0 | S-SBR2 (Tg −28° C.) | 20/27.5 | 20/27.5 | 30/41.3 | 20/27.5 | 10/13.8 |
| 1-1 | Carbon black | 7 | 7 | 7 | 7 | 7 |
| 1-1 | Silica | 80 | 80 | 80 | 80 | 80 |
| 1-1 | Coupling agent | 6.4 | 6.4 | 6.4 | 6.4 | 6.4 |

TABLE 4-continued

| Elastomeric compositions E-I (phr) | | | | | | |
|---|---|---|---|---|---|---|
| | | Components | | | | |
| Step | | E | F | G | H | I |
| 1-1 | Oil | 20 | 20 | 8.8 | 20 | 16.3 |
| 1-1 | Resin | 15 | 15 | 15 | 15 | 15 |
| 1-2 | Stearic acid | 1.5 | 1.5 | 1.5 | 1.5 | 1.5 |
| 1-2 | Zn oxide | 2 | 2 | 2 | 2 | 2 |
| 1-2 | Wax | 1.5 | 1.5 | 1.5 | 1.5 | 1.5 |
| 1-2 | Antidegradants | 5 | 5 | 5 | 5 | 5 |
| 2-0 | Accelerants | 2.5 | 2.5 | 2.5 | 2.5 | 2.5 |
| 2-0 | Sulphur | 1.2 | 1.2 | 1.2 | 1.2 | 1.2 |
| | Total oil (including oil from S-SBR2) | 27.5 | 27.5 | 20.1 | 27.5 | 20.1 |
| | Total plasticiser (total oil + resin) | 42.5 | 42.5 | 35.1 | 42.5 | 35.1 |

S-SBR2 is extended with 37.5 phr of oil per 100 phr of polymer (the table shows the phr of net polymer/the phr of polymer + oil).

The main physical properties of the elastomeric compositions E-I are shown in the following Table 5:

TABLE 5

| | E | F | G | H | I |
|---|---|---|---|---|---|
| Tg (° C.) | −30/−53 | −34/−53 | −28/−53 | −30/−53 | −36/−53 |
| Scorching time (min) 127° C. | 17.8 | 18.6 | 19.7 | 20.2 | 18.5 |
| Viscosity ML (1 + 4)' 100° C. (kPa) | 73.1 | 81.1 | 79.2 | 66.2 | 65.3 |
| MDR | | | | | |
| ML (dNm) | 3.9 | 4.3 | 3.9 | 3.8 | 3.6 |
| MH (dNm) | 23.6 | 24.5 | 23.2 | 22.1 | 22.7 |
| TS2 (min) | 0.8 | 1.0 | 1.0 | 0.9 | 0.9 |
| T30 (min) | 1.4 | 1.5 | 1.5 | 1.4 | 1.3 |
| T60 (min) | 1.7 | 1.8 | 1.9 | 1.7 | 1.6 |
| T90 (min) | 3.0 | 3.4 | 3.4 | 2.6 | 2.5 |
| Density | 1.184 | 1.187 | 1.187 | 1.182 | 1.184 |
| IRHD hardness | 77.8 | 77.2 | 75.8 | 74.0 | 76.1 |
| DIN abrasion (mg) | 56.5 | 71.6 | 68.2 | 56.6 | 53.1 |
| Static properties | | | | | |
| Ca1 (MPa) | 2.4 | 2.3 | 2.2 | 2.1 | 2.0 |
| Ca3 (MPa) | 10.3 | 10.1 | 9.7 | 9.1 | 9.2 |
| CR (Mpa) | 17.4 | 18.0 | 16.4 | 16.9 | 17.4 |
| AR (%) | 475 | 500 | 485 | 524 | 526 |
| Dynamic properties | | | | | |
| E' 100 Hz/−10° C. (MPa) | 17.1 | 16.7 | 19.3 | 17.8 | 16.0 |
| Tan Delta 100 Hz/−10° C. | 0.675 | 0.694 | 0.798 | 0.738 | 0.665 |
| E' 100 Hz/23° C. (MPa) | 9.8 | 9.8 | 10.0 | 9.9 | 9.8 |
| Tan Delta 100 Hz/23° C. | 0.319 | 0.308 | 0.334 | 0.319 | 0.289 |

From the data reported in Table 5 it may be seen that all the compounds showed t-points, as per ISO 6502 method, in line with the vulcanisation conditions, therefore the evaluation of hardness and abrasion appeared to be correct. Furthermore, the static and dynamic properties were in agreement with the expected data for compound compositions for treads.

Figure 4A:
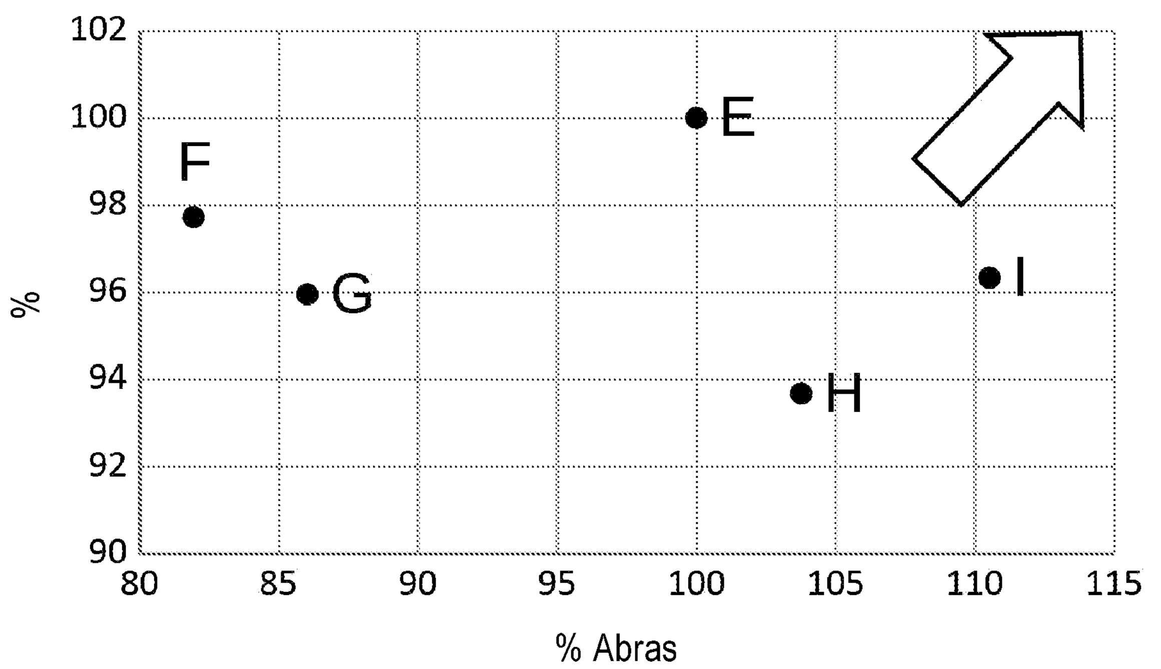
FIG. 4A and FIG. 4B show on the ordinate the hardness values (at 23° C.) and the average of the Tan Delta at −10° C. and +23° C., indicative of the performance on snow (FIG. 4A) and on wet (FIG. 4B), respectively, and, on the abscissa, the abrasion values (mg) indicative of wear, of the compounds E-I, reparameterized by setting the values measured for compound E equal to 100, where the arrow points towards the best performance.
Figure 4B:
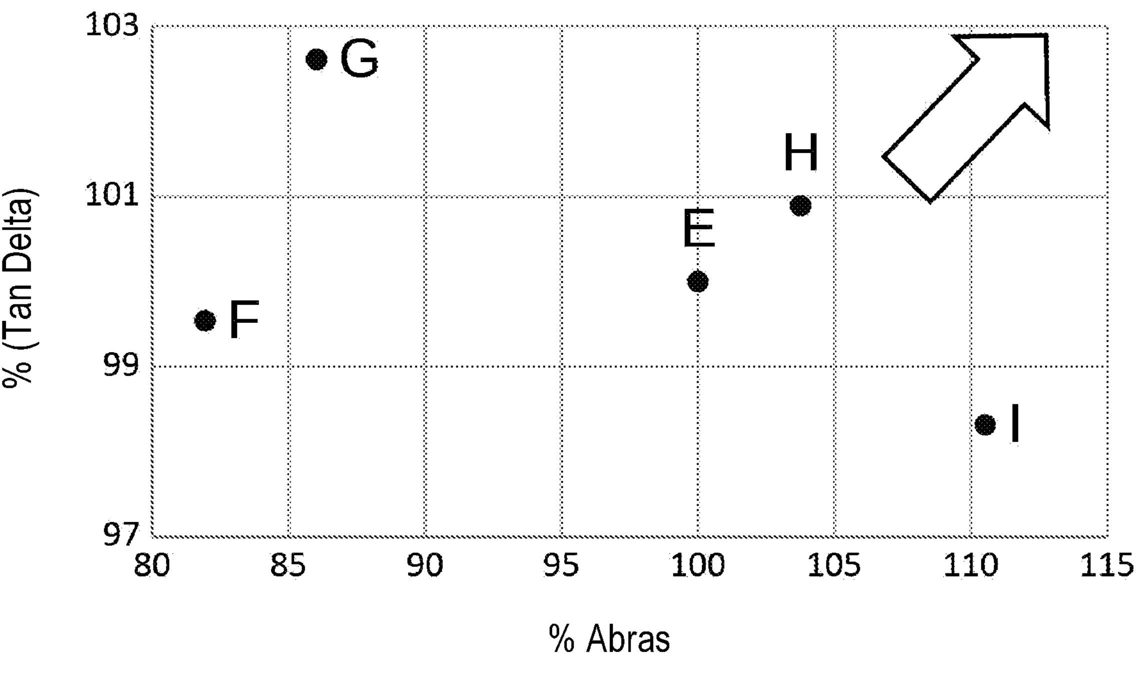

FIG. 4A and FIG. 4B respectively report the hardness and mean values of the Tan Delta values at −10° C. and +23° C. with respect to the abrasion of compounds E-I, predictive of performance in snow conditions, of wet and tyre wear, re-measured by setting to 100 the values measured for compound E.

In particular, FIG. 4A is representative of the balance of performance on snow vs wear while FIG. 4B of the balance of wet vs wear. The arrows indicate the best values for each performance pair.

From the data of Table 5 and from the diagrams of FIGS. 4A and 4B it was highlighted that starting from compound E and reducing the NR content in favour of S-SBR1 with a lower Tg (compound F) or S-SBR2 with a higher Tg (compound G) there was a worsening of the abrasion resistance for both. Compound G, having a higher S-SBR2 content at a higher Tg than that of Compound F showed a higher hysteresis at higher temperatures, predicting better performance in the wet.

On the other hand, by increasing the amount of NR (from compound E to compound H and I), there was an improvement in wear resistance for both, however associated, in the case of compound H, with greater rigidity and therefore worse grip on snow and in the case of compound I to a decline in wet performance.

In conclusion, compound E showed the best performance balance.

Example 5

Similarly to what previously described in Example 1, a conventional reference winter compound L was prepared, with the composition shown in the following Table 6:

TABLE 6

| composition of the reference compound L (phr) | |
|---|---|
| Components | L Ref. |
| NR | 20 |
| S-SBR3 (Tg −25° C.) | 50 |
| BR | 40 |
| Carbon black | 5 |
| Silica | 95 |
| Coupling agent | 6.7 |
| TDAE | 30 |
| Resin | 6 |
| Stearic acid | 2 |
| Zinc oxide | 2 |
| Wax | 2.5 |
| Antidegradants | 5 |
| Accelerants | 3 |
| Sulphur | 1.5 |

wherein:

TDAE is a Treated Distilled Aromatic Extract (HER VIVATEC500 process oil);

TESPD is bis[3-(triethoxysilyl)propyl]disulphide (JH-S75C from JINGZHOU JIANGHAN FINE CHEM.) while the other components correspond to those described at the bottom of Table 2.

The reference compound L showed a single glass transition at a temperature of −36° C.

The main physical properties of the elastomeric compositions L and E are shown in the following Table 7:

TABLE 7

| | L | E |
|---|---|---|
| Tg (° C.) | −36 | −30/−53 |
| Scorching time (min) | 35.9 | 17.6 |
| Viscosity ML (1 + 4)' 100° C. (kPa) | 52.9 | 73.6 |
| MDR | | |
| ML (dNm) | 2.5 | 3.9 |
| MH (dNm) | 16.7 | 22.1 |
| TS2 (min) | 1.7 | 0.9 |
| T30 (min) | 2.0 | 1.4 |
| T60 (min) | 2.4 | 1.7 |
| T90 (min) | 3.7 | 2.7 |
| Density | 1.192 | 1.183 |
| IRHD hardness | 66.9 | 74.6 |
| DIN abrasion | 65.7 | 56.5 |
| Static properties | | |
| Ca1 (MPa) | 1.7 | 2.0 |
| Ca3 (MPa) | 7.6 | 8.8 |
| CR (MPa) | 14.6 | 17.5 |
| AR (%) | 528 | 531 |
| Dynamic properties | | |
| E' 100 Hz/−10° C. (MPa) | 9.6 | 9.7 |
| Tan Delta 100 Hz/−10° C. | 0.436 | 0.462 |
| E' 100 Hz/23° C. (MPa) | 6.6 | 7.5 |
| Tan Delta 100 Hz/23° C. | 0.220 | 0.246 |
| E' 100 Hz/70° C. (MPa) | 4.9 | 5.9 |
| Tan Delta 100 Hz/70° C. | 0.158 | 0.156 |

Driving Tests

Car tyres with tread band prepared by vulcanisation of the reference elastomeric composition L and according to the invention E were produced and subjected to driving tests.

All tyres were 205/55R16 size, with 6.5J×16 ET46 rim and 2.4 bar inflation pressure for the front and rear tyres.

The tests were carried out by equipping a Volkswagen Golf car for all tests on snow, dry and wet.

Braking tests on dry and wet roads, behaviour tests driving on dry and wet roads and driving and braking tests on snow-covered road were conducted.

The braking test took place with tyres fitted to a vehicle equipped with an anti-lock braking system (ABS).

The braking test was carried out on a straight asphalt section both in dry and wet conditions, measuring the stopping distance from a predetermined initial speed, typically 100 km/h in dry conditions and 80 km/h in wet conditions.

The driving behaviour test, on dry or wet surfaces, was carried out on predefined routes, typically circuits closed to traffic. By simulating some typical manoeuvres (such as changing lanes, overtaking, slalom between skittles, entering and exiting corners) performed at a constant speed, and in acceleration and deceleration, the test driver evaluated the tyre performance giving a numerical evaluation of the behaviour of the latter during the above manoeuvres.

The braking test on snow-covered road was carried out subjecting the vehicle to deceleration from 50 to 5 km/h using both the wheel anti-blocking system (A.B.S.) and the drive with blocked wheels.

The traction test on a snow-covered road was carried out by subjecting the vehicle to acceleration from 0 to 35/40 km/h and measuring the traction force exerted by the tyre on the snow-covered road surface with accelerometers.

The results of the rolling resistance test and of the driving tests, where the values of the assessments were re-measured by setting the values relating to the reference tyre L to 100, are shown in the following Table 7:

TABLE 7

| (280 km/h - 1 min) | | |
|---|---|---|
| | L (Ref.) | E (Inv.) |
| Rolling Resistance (RR) | 8.3 | 7.5 |
| Braking on wet | 100 | 100 |
| Wet handling | 100 | 111 |
| Dry braking | 100 | 101 |
| Dry handling | 100 | 102 |
| Braking on snow | 100 | 98 |
| Snow traction | 100 | 97 |
| Handling on snow | 100 | 106 |

From the results shown in Table 7 it may be seen that the driving performances of the tyre according to the invention, the tread of which consisted of compound E, were more balanced and, as regards handling on wet and snow, also significantly improved compared to those of the reference winter tyre. Furthermore, the tyre of the invention advantageously had a lower rolling resistance.

In conclusion, the examples described herein show that compounds for tyre treads comprising mixtures of certain elastomeric polymers, each of them present in specific amounts, resulted in a particular hysteresis pattern as the temperature varied, i.e. upon the appearance of a double peak, the maximum values of which to were positioned precisely in the temperature ranges relevant to the performance on snow or respectively on wet surfaces of the tyre.

This particular hysteretic behaviour of the compounds according to the invention entails several advantages compared to conventional compounds characterised by a single Tan delta peak, such as guaranteeing the mobility of the rubber in the range is of very low temperatures for snow, extending the working range of the tyre in the wet performance area and providing good wear resistance.

The invention claimed is:

1. An elastomeric composition for tyre compounds comprising:

100 phr of a composition of elastomeric polymers (A) consisting of:

(A1) from 35 phr to 65 phr of at least one isoprene polymer (IR) having a Tg ranging from −70° C. to −60° C., (A2) from 15 phr to 45 phr of at least one styrene-butadiene polymer (SBR) having a Tg ranging from −70° C. to −55° C., (A3) from 5 phr to 40 phr of at least one styrene-butadiene polymer (SBR) having a Tg ranging from −35° C. to −25° C., from 5 phr to 25 phr of at least one resin (B), from 5 phr to 45 phr of at least one plasticising oil (C), at least 10 phr of at least one reinforcing filler (D), and at least 0.5 phr of the at least one vulcanising agent (E), wherein the total amount of plasticiser, including both the resin (B) and the oil (C), is from 25 phr to 55 phr.

2. The elastomeric composition according to claim 1, wherein the composition comprises:

100 phr of a composition of elastomeric polymers (A) consisting of:

(A1) from 40 phr to 60 phr of at least one isoprene polymer (IR) having a Tg of ranging from −65° C. to −60° C., (A2) from 20 phr to 40 phr of at least one styrene-butadiene polymer (SBR) having a Tg ranging from −70° C. to −55° C., and (A3) from 10 phr to 35 phr of at least one styrene-butadiene polymer (SBR) having a Tg ranging from −35° C. to −25° C.

3. The elastomeric composition according to claim 1, wherein the composition comprises:

from 7 phr to 20 phr of at least one resin (B), from 10 phr to 35 phr of at least one plasticising oil (C), at least 20 phr of at least one reinforcing filler (D), and at least 0.5 phr of the at least one vulcanising agent (E).

4. The elastomeric composition according to claim 1, wherein the styrene-butadiene polymer (SBR) (A2) and/or (A3) is a copolymer comprising monomer units of styrene and butadiene, with a percentage of styrene comprised between 10 and 30% and of vinyl between 25 and 65%.

5. The elastomeric composition according to claim 1, wherein the styrene-butadiene polymer (SBR) (A2), (A3), or both is a copolymer prepared by solution polymerisation (S-SBR).

6. The elastomeric composition according to claim 1, wherein the styrene-butadiene polymer (SBR) (A2), (A3), or both is/are a copolymer functionalised with at least one group chosen from alkoxysilanes, mercaptosilanes, sulphur-containing groups, amino groups, amide groups, epoxides, hydroxides, and combinations thereof.

7. The elastomeric composition according to claim 1, wherein the composition comprises:

100 phr of a composition of elastomeric polymers (A) consisting of:

(A1) from 45 phr to 55 phr of at least one isoprene polymer (IR) having a Tg ranging from −65° C. to −60° C., (A2) from 25 phr to 35 phr of at least one styrene-butadiene polymer (SBR) having a Tg ranging from −65° C. and −60° C., (A3) from 15 phr to 25 phr of at least one styrene-butadiene polymer (SBR) having a Tg of between −30° C. and −25° C.

8. The elastomeric composition according to claim 7, further comprising:

from 10 phr to 20 phr of at least one resin (B), from 20 phr to 30 phr of at least one plasticising oil (C), at least 20 phr of at least one reinforcing filler (D), and at least 1 phr of the at least one vulcanising agent (E).

9. A vulcanised elastomeric compound for tyres obtained by mixing and vulcanising the elastomeric composition according to claim 1.

10. The elastomeric compound according to claim 9, wherein the elastomeric compound is characterized by at least a first glass transition temperature Tg1 ranging from −65° C. to −40° C. and by at least a second glass transition temperature Tg2 ranging from −45° C. and −15° C., measured by dynamo-mechanical analysis (DMA).

11. A tyre component comprising the elastomeric compound according to claim 10.

12. The tyre component according to claim 11, wherein the tyre component is chosen from tread band, underlayer, anti-abrasive layer, sidewall, sidewall insert, mini-sidewall, liner, underliner, rubber layers, bead filler, bead reinforcing layers (flipper), bead protection layers (chafer), sheet, and combinations thereof.

13. A tyre for vehicle wheels comprising at least one tyre component according to claim 11.

14. The tyre according to claim 13, wherein the component is a tread band.

15. The tyre according to claim 13 for all-season use.

* * * * *